(12) United States Patent
Lienhart et al.

(10) Patent No.: US 7,203,669 B2
(45) Date of Patent: Apr. 10, 2007

(54) DETECTOR TREE OF BOOSTED CLASSIFIERS FOR REAL-TIME OBJECT DETECTION AND TRACKING

(75) Inventors: Rainer W. Lienhart, Santa Clara, CA (US); Luhong Liang, Beijing (CN); Alexander Kuranov, Vetluzhzky (RU)

(73) Assignee: Intel Corporation, Santa Clara, CA (US)

( * ) Notice: Subject to any disclaimer, the term of this patent is extended or adjusted under 35 U.S.C. 154(b) by 423 days.

(21) Appl. No.: 10/401,125

(22) Filed: Mar. 26, 2003

(65) Prior Publication Data

US 2004/0186816 A1    Sep. 23, 2004

Related U.S. Application Data

(60) Provisional application No. 60/456,033, filed on Mar. 17, 2003.

(51) Int. Cl.
| | |
|---|---|
| *G06F 17/00* | (2006.01) |
| *G06F 15/18* | (2006.01) |
| *G06N 5/02* | (2006.01) |
| *G06N 5/00* | (2006.01) |
| *G06E 1/00* | (2006.01) |
| *G06E 3/00* | (2006.01) |
| *G06G 7/00* | (2006.01) |

(52) U.S. Cl. .................. 706/48; 706/45; 706/20
(58) Field of Classification Search .................. 706/20, 706/17, 45, 48; 348/169–172; 375/240.08, 375/240.12, 240.16; 382/103
See application file for complete search history.

(56) References Cited

U.S. PATENT DOCUMENTS

| 5,078,952 | A | * | 1/1992 | Gozani et al. ............... 376/159 |
|---|---|---|---|---|
| 5,621,861 | A | * | 4/1997 | Hayashi et al. ............... 706/25 |
| 6,445,409 | B1 | * | 9/2002 | Ito et al. ..................... 348/155 |
| 6,456,993 | B1 | * | 9/2002 | Freund ........................ 706/47 |
| 6,546,379 | B1 | * | 4/2003 | Hong et al. .................. 706/14 |
| 6,556,983 | B1 | * | 4/2003 | Altschuler et al. ............ 706/55 |
| 6,662,170 | B1 | * | 12/2003 | Dom et al. .................... 706/45 |
| 6,801,662 | B1 | * | 10/2004 | Owechko et al. ............ 382/224 |
| 6,823,323 | B2 | * | 11/2004 | Forman et al. ............... 706/20 |
| 6,859,455 | B1 | * | 2/2005 | Yazdani et al. .............. 370/392 |
| 2001/0037324 | A1 | * | 11/2001 | Agrawal et al. ................ 707/1 |
| 2003/0018475 | A1 | * | 1/2003 | Basu et al. .................. 704/270 |
| 2003/0123456 | A1 | * | 7/2003 | Denz et al. .................. 370/400 |
| 2003/0176931 | A1 | * | 9/2003 | Pednault et al. .............. 700/31 |
| 2006/0034484 | A1 | * | 2/2006 | Bahlmann et al. .......... 382/103 |

OTHER PUBLICATIONS

Lippmann, R.P.; "Pattern classification using neural networks." IEEE Communications Magazine, vol. 27, Issue 11, Nov. 1989 pp. 47-50, 59-64.*

Sarkar, Manish; "Modular Pattern Classifiers: A Brief Survey" 2000 IEEE International Conference on Systems, Man, and Cybernetics. vol. 4, Oct. 8-11, 2000 pp. 2878-2883 vol. 4 □□.*

(Continued)

*Primary Examiner*—Joseph P Hirl
*Assistant Examiner*—Benjamin Buss
(74) *Attorney, Agent, or Firm*—Fish & Richardson P.C.

(57) ABSTRACT

A tree classifier may include a number of stages. Some stages may include monolithic classifiers, and other stages may be split into two or more classifiers.

13 Claims, 12 Drawing Sheets

OTHER PUBLICATIONS

Y. Freund et al.; "Experiments with a New Boosting Algorithm"; Machine Learning: Proceedings of teh Thirteenth International Conference. AT&T Corp; 1996; pp. 148-156.*

Dante, H.; "On the problem of dimensionality and sample size in multi-stage pattern classifiers." Acoustics, Speech, and Signal Processing, IEEE International Conference on ICASSP '84. vol. 9, Part 1, Mar. 1984 pp. 376-379.*

Lienhart, R., Liang, L., and Kuranov, A. "A Detector Tree of Boosted Classifiers for Real-Time Object Detection and Tracking." Microcomputer Research Labs, Intel Corperation, Santa Clara, CA. 2003.*

Sedgewick, Robert. "Algorithms in Java, Third Edition, Parts 1-4: Fundamentals, Data Structures, Sorting, Searching; Chapter 5. Recursion and Trees."*

Sivadas, S. and Hermansky, H. "Hierarchical Tandem Feature Extraction." in ICASSP, Orlando, Florida, USA, May, 2002.*

Viola, P.; Jones, M.; "Rapid object detection using a boosted cascade of simple features." Computer Vision and Pattern Recognition, 2001. CVPR 2001. Proceedings of the 2001 IEEE Computer Society Conference on. vol. 1, 2001 pp. I-511-I-518 vol. 1.*

Viola, Paul and Jones, Michael.; "Robust Real-time Object Detection." Second International Worksho on Statistical and Computational Theories of Vision—Modeling, Leaning, Computing, and Sampling. Vancouver, Canada, Jul. 13, 2001.*

Sarkar, Manish; "Modular Pattern Classifiers: A Brief Survey" 2000 IEEE International Conference on Systems, Man, and Cybernetics. vol. 4, Oct. 8-11, 2000 pp. 2878-2883 vol. 4.*

Amit,Y and German,D and Wilder,K. "Joint Induction of Shape Features and Tree Classifiers" IEEE. Nov. 1997.*

Ho,T-K and Hull,J-J and Srihari,S-N. "Decision Combination in Multiple Classifier Systems" IEEE. Jan. 1994.*

Ho,T-K. "The Random Subspace Method for Constructing Decision Forests" IEEE. Aug. 1998.*

Rowley,H-A and Baluja-S and Kanade-T. "Neural Network-Based Face Detection" PAMI, Jan. 1998.*

Lienhart,R. et. al. "Empirical Analysis of Detection Cascades of Boosted Classifiers for Rapid Object Detection." 2003.*

Masulli,F. et. al. "Effectivenness of error correcting output coding methods in ensemble and monolithic learning machines" Feb. 2003.*

Cordea, M., et al., "Real-Time 2(1/2)-D Head Pose Recovery for Model-Based Video-Coding", *IEEE Trans. on Instrumentation and Measurement*, 50(4):1007-1013, 2001.

Freund, Y., et al., "A Short Introduction to Boosting", *J. of Japanese Society for AI*, 14(5):771-780, 1999 (w/translation, 18 pages).

Liang, L., et al., "Speaker Independent Audio-Visual Continuous Speech Recognition", *IEEE ICME*, Lausanne, Switzerland, pp. 25-28, 2002.

Lienhart, R., et al., "An Extended Set of Haar-Like Features for Rapid Object Detection", *IEEE ICIP*, pp. 900-903, 2002.

Luettin, J., et al., "Evaluation Protocol for the XM2FDB Database", *In IDIAP-COM 98-05*, 1998 (13 pages).

Open Source Computer Vision Library, http://www.intel.com/technology/computing/opencv/index.htm (2 pages).

Osuna, E., et al., "Training Support Vector Machines: an Application to Face Detection", *In Proc. of CVPR*, Puerto Rico, pp. 130-136, 1977.

Papageorgiou, C., et al., "A General Framework for Object Detection", *International Conference on Computer Vision*, Bombay, India, pp. 555-562, 1998.

Rowley, H., et al., "Neural Network-Based Face Detection", *IEEE Trans PAMI*, 20(1):23-38, 1998.

Sung, K., et al., "Example-Based Learning for View-Based Human Face Detection", *IEEE Trans PAMI*, 20(1):39-51, 1998.

Zhang, Z., et al., "Real-Time Multi-View Face Detection", *Proc. of 5th IEEE International Conference of Automatic Face and Gesture Recognition*, Washington, D.C., USA, 2002 (6 pages).

* cited by examiner

Given: $(x_1, y_1), \ldots, (x_m, y_m)$ where $x_i \in X, y_i \in Y = \{-1, +1\}$
Initialize $D_1(i) = 1/m$
For $t = 1, \ldots, T$:

- Train weak learner using distribution $D_t$.
- Get weak hypothesis $h_t : X \to \{-1, +1\}$ with error $$\epsilon_t = \Pr_{i \sim D_E}[h_t(x_i) \neq y_i].$$

- Choose $\alpha t = 1/2 \ln\left(\frac{1-\epsilon_t}{\epsilon_t}\right)$

Update: ⟵ 205

$$D_{t+1}(i) = \frac{D_t(i)}{Z_t} \times \begin{cases} e^{-\alpha t} & \text{if } h_t(x_i) = y_i \\ e^{\alpha t} & \text{if } h_t(x_i) \neq y_i \end{cases}$$

$$= \frac{D_t(i)\exp(-\alpha_t y_i h_t(x_i))}{Z_t}$$

where Zt is a normalization factor (chosen so that $D_{t+1}$ will be a distribution).

Output the final hypothesis:

$$H(x) = \text{sign}\left(\sum_{t=1}^{T} \alpha_t h_t(x)\right)$$

FIG. 3B-2 struct TreeNode {
　BoostedClassifier* bc=0;
　TreeNode* next=0, child=0, parent=0;
　TrainingData *posSampleIdx; // Describes positive training set
　int evaluate( sample ); // Evaluate sample given the tree node by
　// tracing back the path to the root node and constructing a cascade classifier
　TreeNode(TreeNode * _parent, TrainingData * _Idx, TreeNode * _next)
　{parent = _parent; posSampleIdx = _Idx; next = _next; }
};

startTreeTraining()
　1. Create new TN=TreeNode(0, all positive training examples, 0)
   2. nodeTraining(TN, 0, TARGET_HEIGHT_OF_TREE)

FIG. 4

**nodeTraining(TreeNode* parent, curLevel, stopLevel)**
1. If (stopLevel == curLevel) return;
2. Load all positive training examples SPOS assigned to the parent node by parent->posSampleIdx and filter with parent->evaluate()
3. Load negative training set SNEG of size CNEG filtered with parent->evaluate()
4. Train standard stage classifier $S^1$ with SPOS plus SNEG. Let $O(S^1)$ denote the number of features needed for achieving a given performance
5. BestClassifier = $S^1$ ; BestNoOfFeatures = $O(S^1)$
6. For $k=2$ to $K_{max}$
   a. Calculate for SPOS all features used in stage classifier $S^1$. Do $k$-means clustering on feature data and create $k$ sets $SPOS_i$ of positive training examples.
   b. Train $k$ standard stage classifiers $S^k_i$ on $SPOS_i$ plus SNEG.
   c. If (BestNoOfFeatures > $O(S^k_1) + ... + O(S^k_k)$)
      i.  BestNoOfFeatures = $O(S^k_1) + ... + O(S^k_k)$
      ii. BestClassifier = { $S^k_1, ..., S^k_k$ }
7. TreeNode* $TN_0$ = 0
8. For each classifier $S^k_i$ in BestClassifier
   a. Create new TreeNode * $TN_i$ =TreeNode(parent, $SPOS_i$, $TN_{i-1}$)
   b. nodeTraining($TN_i$, curLevel+1, stopLevel)

DETECTOR TREE OF BOOSTED CLASSIFIERS FOR REAL-TIME OBJECT DETECTION AND TRACKING

CROSS-REFERENCE TO RELATED APPLICATION

This application claims benefit of the priority of the U.S. Provisional Application No. 60/456,033 filed Mar. 17, 2003 and entitled "A Detector Tree of Boosted Classifiers for Real-Time Object Detection and Tracking."

BACKGROUND

Object detection and tracking in video sequences may be important in applications such as content-based retrieval, natural human-computer interfaces, object-based video compression, and video surveillance. Classifiers which provide early rejection of non-object patterns may be used for object detection and tracking. In one approach, a number of classifiers may be arranged in a cascade. An input pattern may be evaluated by a first classifier trained to remove a certain percentage of non-object patterns while keeping all object patterns. Second and subsequent stage classifiers may be trained in the same manner. After N stages, the false alarm rate may drop very close to zero while maintaining a high hit rate.

From stage to stage a more complex classifier may be needed to achieve the goal. While the cascade approach has been successfully validated for frontal upright face detection, which tend to be very regular and similar, cascade classifiers may have difficulty handling visually more complex and diverse object classes such as multi-view faces and mouths.

DETAILED DESCRIPTION

Figure 1:
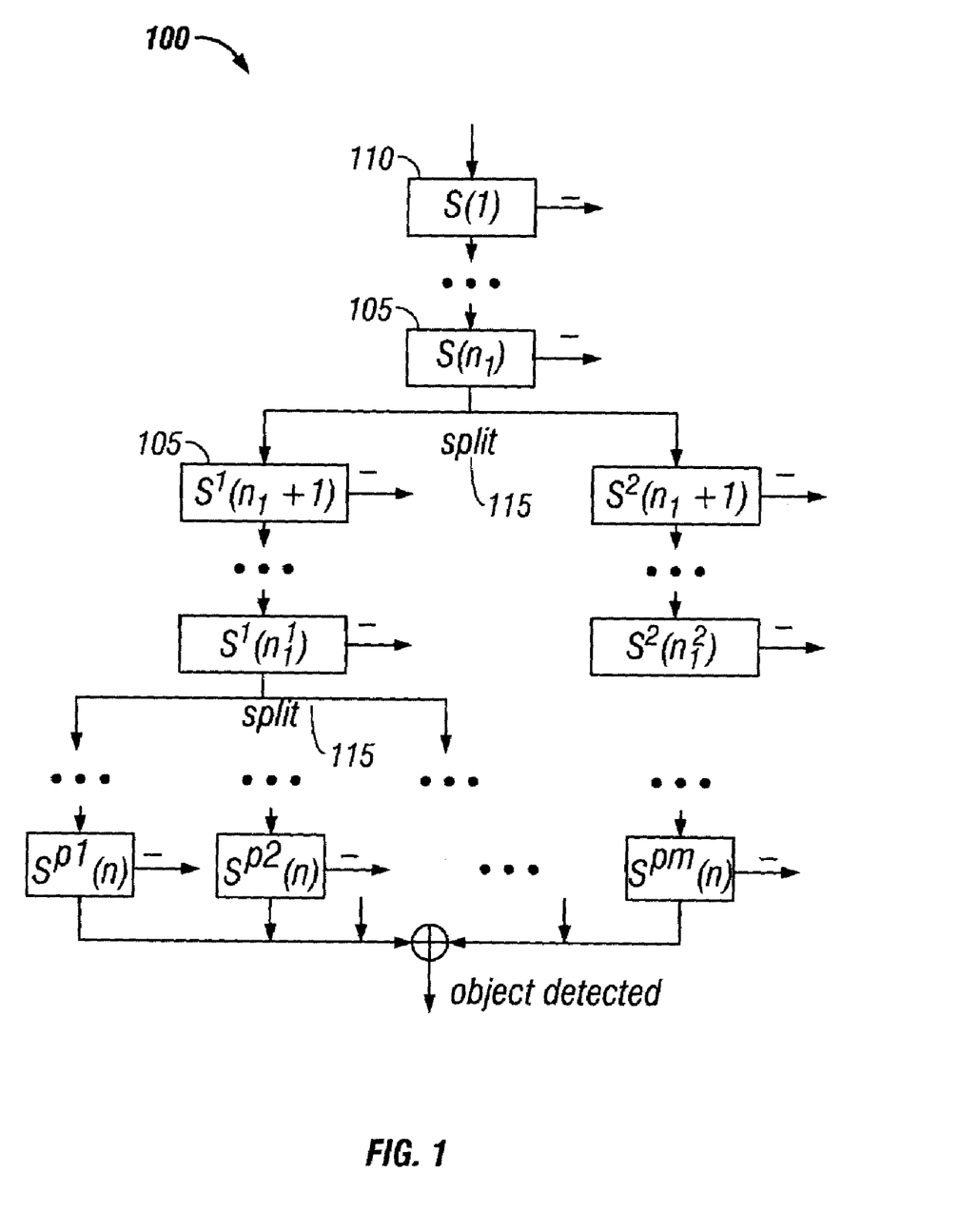
FIG. 1 is a block diagram of a tree classifier.

FIG. 1 shows a tree classifier 100 which may be used to perform real-time object tracking and detection. The tree classifier 100 includes a number of classifiers 105 arranged in a tree-like structure. The classifiers constitute nodes in the tree.

A node in the tree may have depending nodes, which are lower in the hierarchy. The node may be referred to as a parent node, and the nodes depending from the parent node may be referred to as child nodes. The parent node may be a child node of another node higher in the tree-structure.

The tree classifier includes a root node 110 at the top of the tree. The root node distinguishes itself from other nodes by not having a parent. There may be splits 115 in the branches of the tree, where a parent has two or more child nodes. The different child nodes at a split may be specialized to classify different features of the input.

The classifiers may be used to filter input images to identify a specified object, e.g., a face. The classifiers may be boosted classifiers trained to have a high hit rate (e.g., 99.9%) and a moderate false positive (false alarm) rate (e.g., 50%). A classifier may be able to identify specified objects with extremely high accuracy and identify non-pattern images, e.g., images not including the specified object, about half of the time.

The classifiers may be trained using a boosting algorithm such as AdaBoost. Psuedocode 200 for AdaBoost is given in FIG. 2. The AdaBoost algorithm takes as input a training set $(x_1, y_1), \ldots, (x_m, y_m)$, where each $x_i$ belongs to some domain or instance space X, and each label $y_i$ is in some label set Y. AdaBoost calls a given weak, or base, learning algorithm repeatedly in a series of rounds $t=1, \ldots, T$. A distribution or set of weights may be maintained over the training set. The weight of this distribution on training example i on round t is denoted $D_t(i)$.

Figure 2:
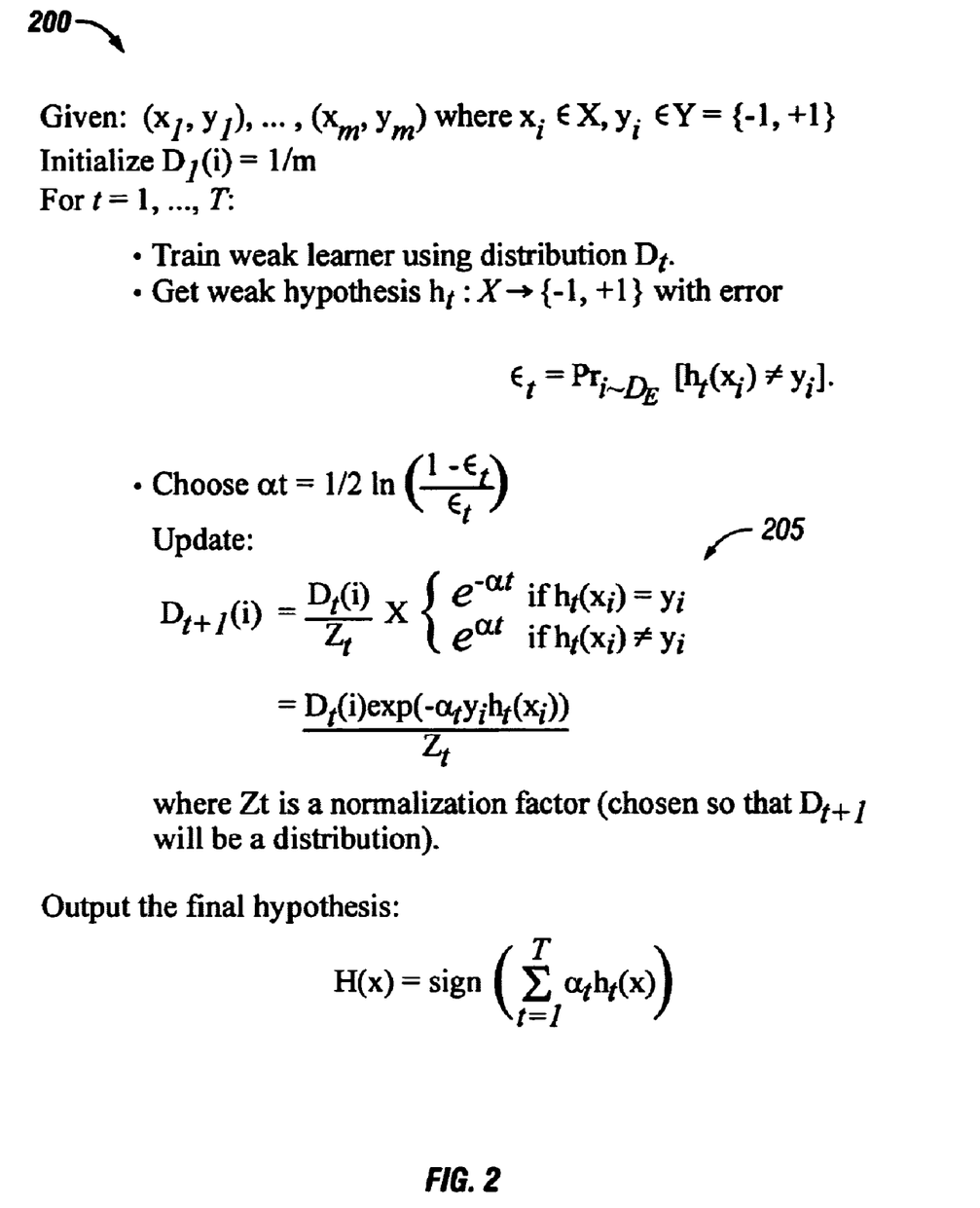
FIG. 2 shows pseudo code describing a boosting algorithm for training classifiers.

Initially, all weights may be set equally, but on each round, the weights of incorrectly classified examples may be increased so that the weak learner is forced to focus on the hard examples in the training set. The weak learner's job may try to find a weak hypothesis $h_t: X \to \{-1, +1\}$ appropriate for the distribution $D_t$. The goodness of a weak hypothesis is measured by its error:

$$\epsilon_t = Pr_{i \sim D_t}[h_t(x_i) \neq y_i] = \sum_{h_t(x_i) \neq y_i} D_t(i)$$

The error may be measured with respect to the distribution $D_t$ on which the weak learner was trained. In practice, the weak learner may be an algorithm that can use the weights $D_t$ on the training examples. Alternatively, a subset of the training examples may be sampled according to $D_t$, and the unweighted, resampled examples can be used to train the weak learner.

Once the weak hypothesis ht has been received, AdaBoost may choose a parameter $\alpha_t$, which measures the importance that is assigned to $h_t$. Generally, $\alpha_t \geq 0$ if $\epsilon_t \leq \frac{1}{2}$, and $\alpha_t$ gets larger as $\epsilon_t$ gets smaller.

The distribution $D_t$ may be updated using the update rule 205 shown in FIG. 2. The effect of this rule is to increase the weight of examples misclassified by $h_t$ and to decrease the weight of correctly classified examples. Thus, the weight tends to concentrate on "hard" examples. The final hypothesis H is a weighted majority vote of the T weak hypotheses where $\alpha_t$ is the weight assigned to $h_t$.

The classifiers may be trained using a set of positive training samples (including the specified object) and a set of negative training samples (not including the specified object). The tree may be grown by training the classifiers using a recursive algorithm such that the tree will grow until a desired depth is achieved. The desired depth is either pre-specified or adaptively chosen based on the desired combination of hit and false alarm rate.

Figure 3A:
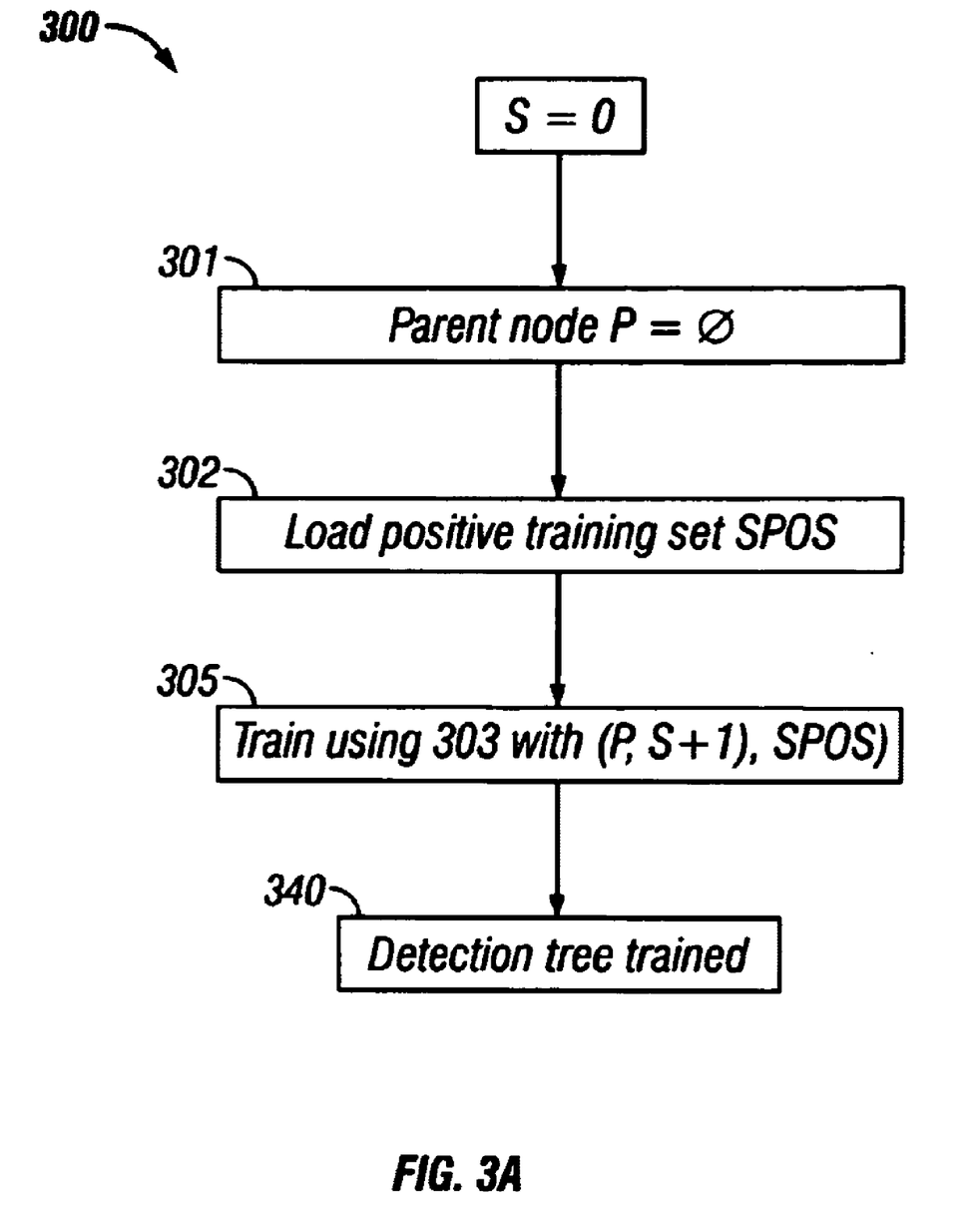
FIGS. 3A and 3B show a flowchart describing an algorithm for growing and training a tree classifier.
Figure 3B:
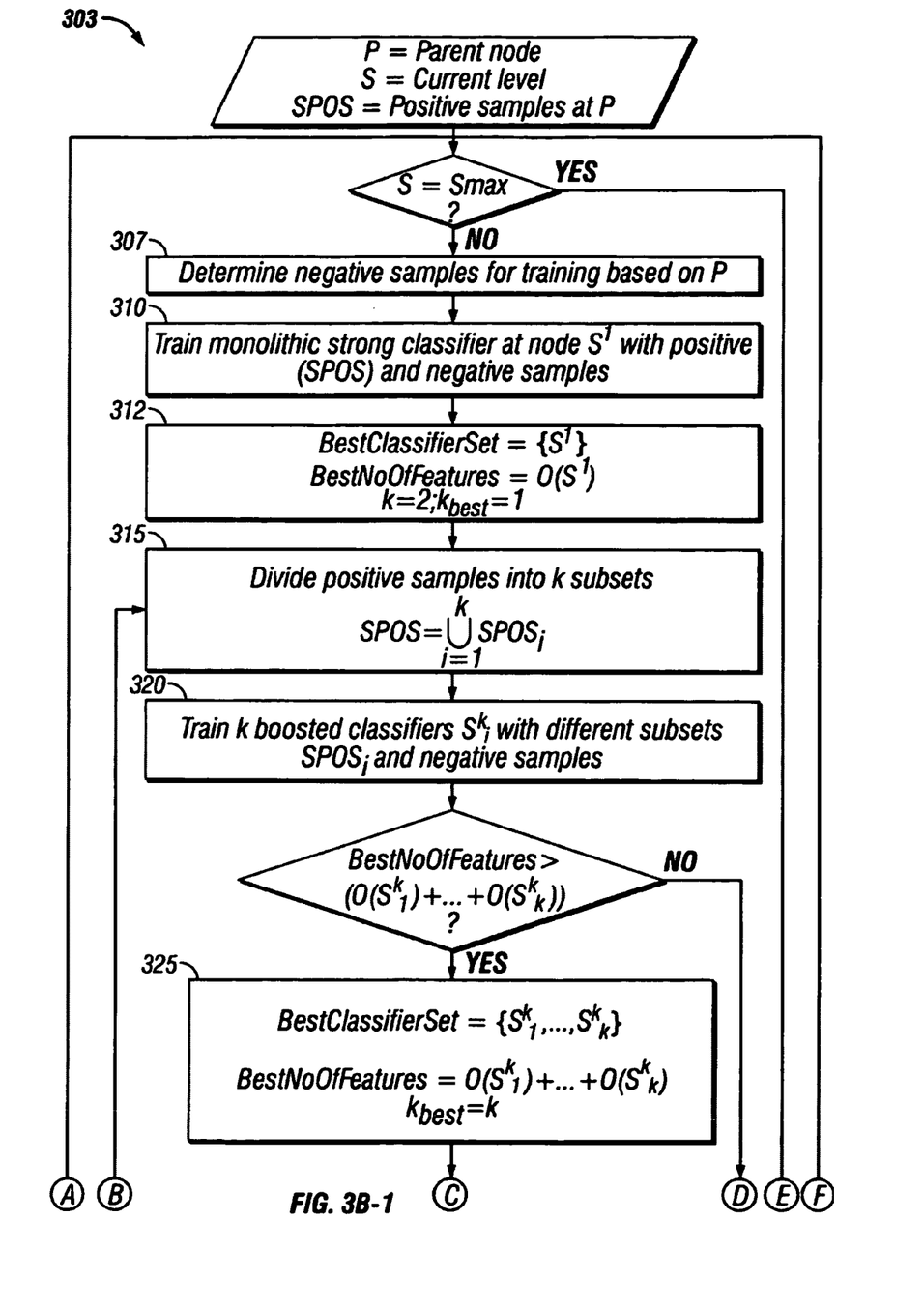
Figure 3B:
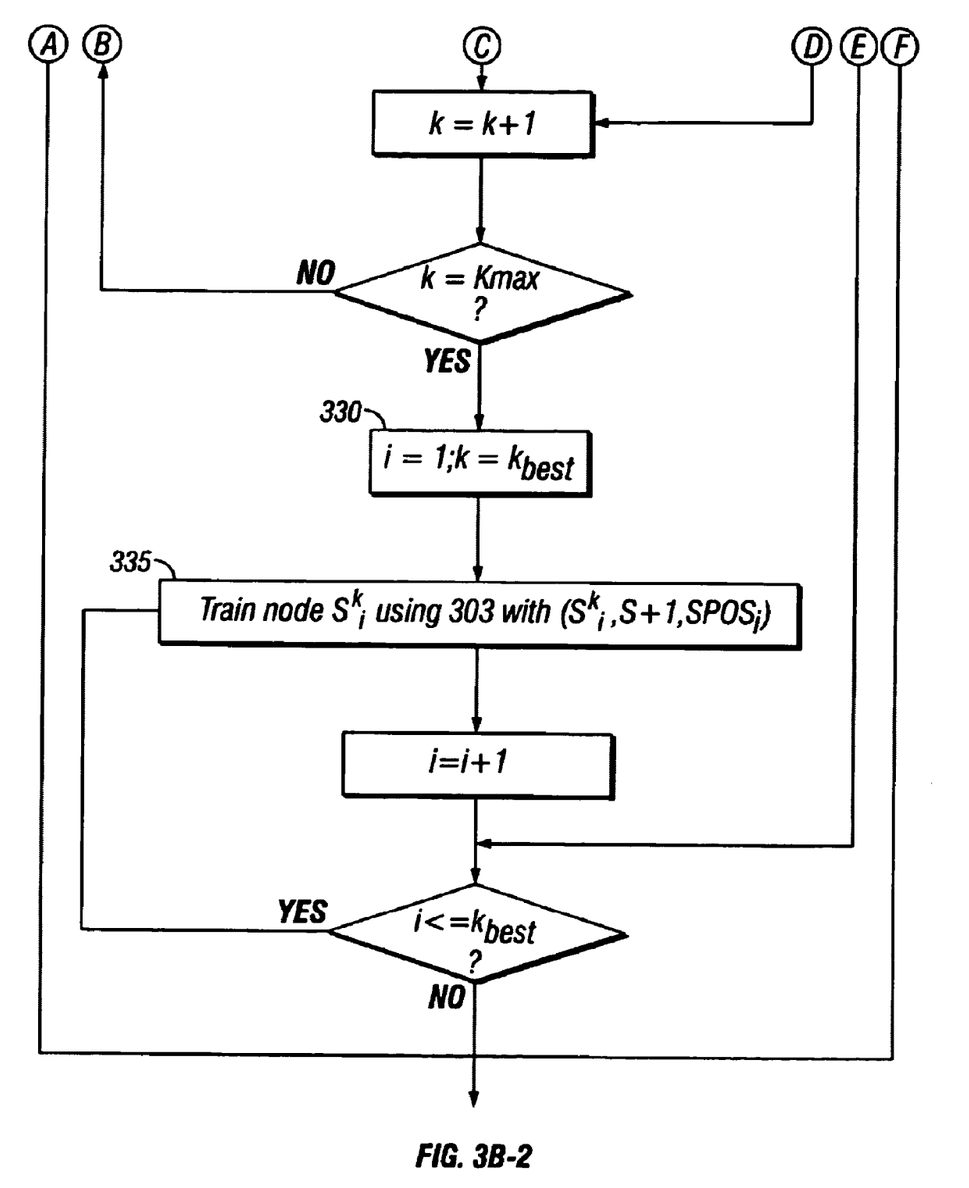
Figure 4:
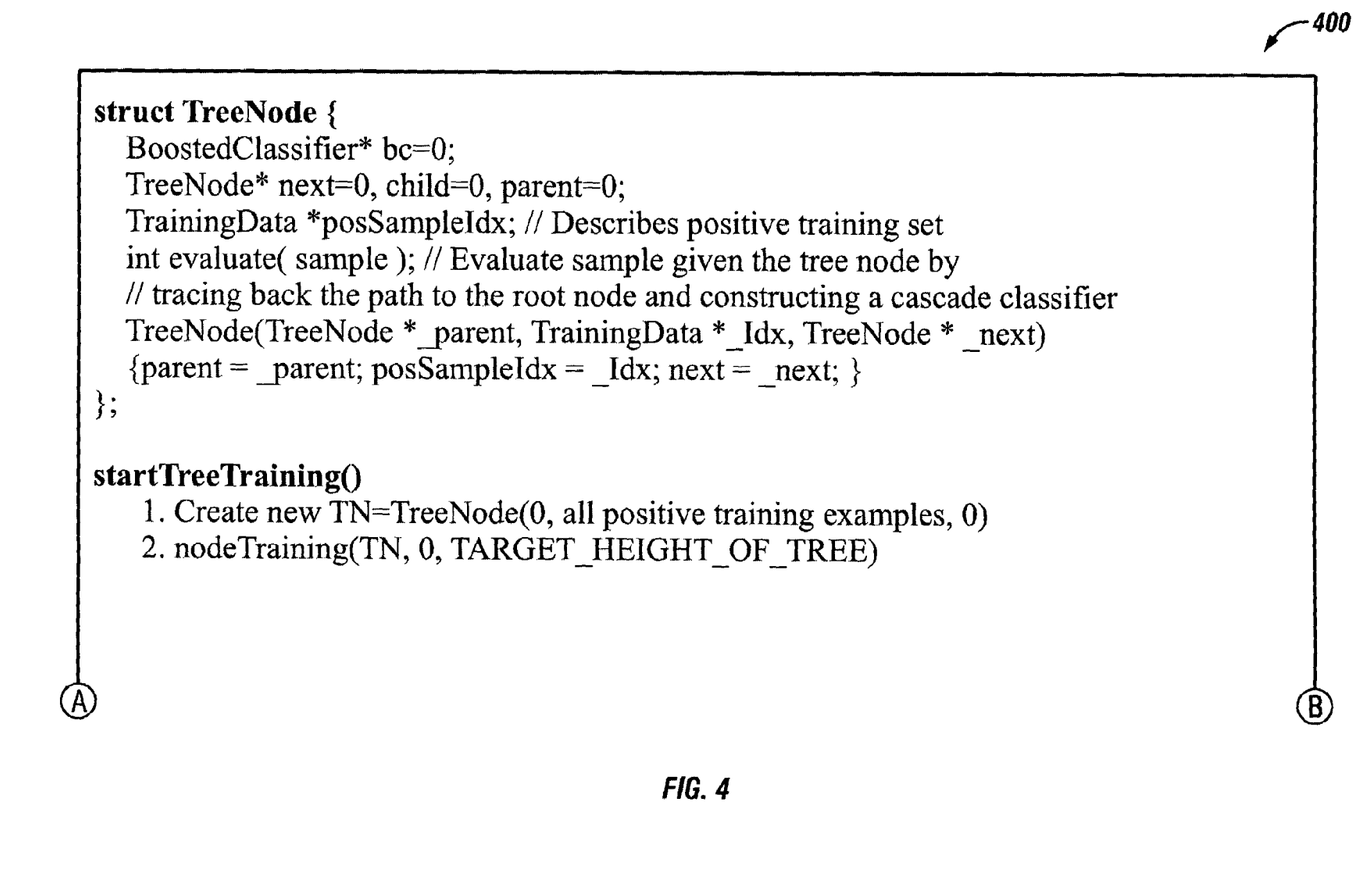
FIG. 4 shows pseudo code describing an algorithm for growing and training a tree classifier.

An exemplary algorithm for growing and training a tree classifier is described in the flowchart 300 in FIG. 3A and psuedocode 400 in FIG. 4. Training may start with an empty tree node (P=∅) (block 301). The positive training set (SPOS) loaded into the root tree node (block 302) may include the complete training set. The nodes may be training using a recursive training algorithm 303 (block 305), shown in FIG. 3B.

At each node, the negative training samples may be specified or filtered by the parent node (block 307). A monolithic strong classifier at node S1 may be trained with positive (SPOS) and negative samples (block 310).

At each node level, a determination is made whether to keep the monolithic classifier or split the tree into different branches, each branch including a node with a classifier trained to filter a different subclass of the object of interest. The splitting criterion may be based on the minimal number of features, and hence the lowest computational complexity, needed to achieve a given training hit and false alarm rate ignoring the overall detection performance.

After the monolithic classifier is trained, the BestClassifierSet variable is set to identify the monolithic classifier ($S_1$), and the BestNoOfFeatures is set to the number of features used by the monolithic classifier (block 312). Next, the computational complexity of two or more sets of specialized classifiers is determined.

A k-means clustering algorithm may be utilized to divide the positive samples into k subsets (block 315). The k positive subsets and the negative samples may be used to train k strong classifiers (block 320). If the total number of features used by these k classifiers ($O(S^k1)+\ldots+O(S^kk)$) is less than the total number of features used in the monolithic classifier ($O(S^1)$), the k strong classifiers are considered to be computational more efficient than the monolithic classifier. If so, BestClassifierSet is set to identify this set of k specialized classifiers ($S^k_1, \ldots, S^k_k$) and BestNoOfFeatures is set to the total number of features used by the specialized classifiers (block 325). This process may be repeated up to $K_{max}$.

The variable $k_{best}$ is updated throughout the process. If $k_{best}$ is "1", then the monolithic classifier is selected for the node level, otherwise the set of specialized classifiers which uses the least total number of features is selected (block 330). The process is repeated in each of the branches of the split (block 335). The training process 303 may be recursively applied until a given target depth ($S_{max}$) of the tree is reached (block 340).

Figure 5A:
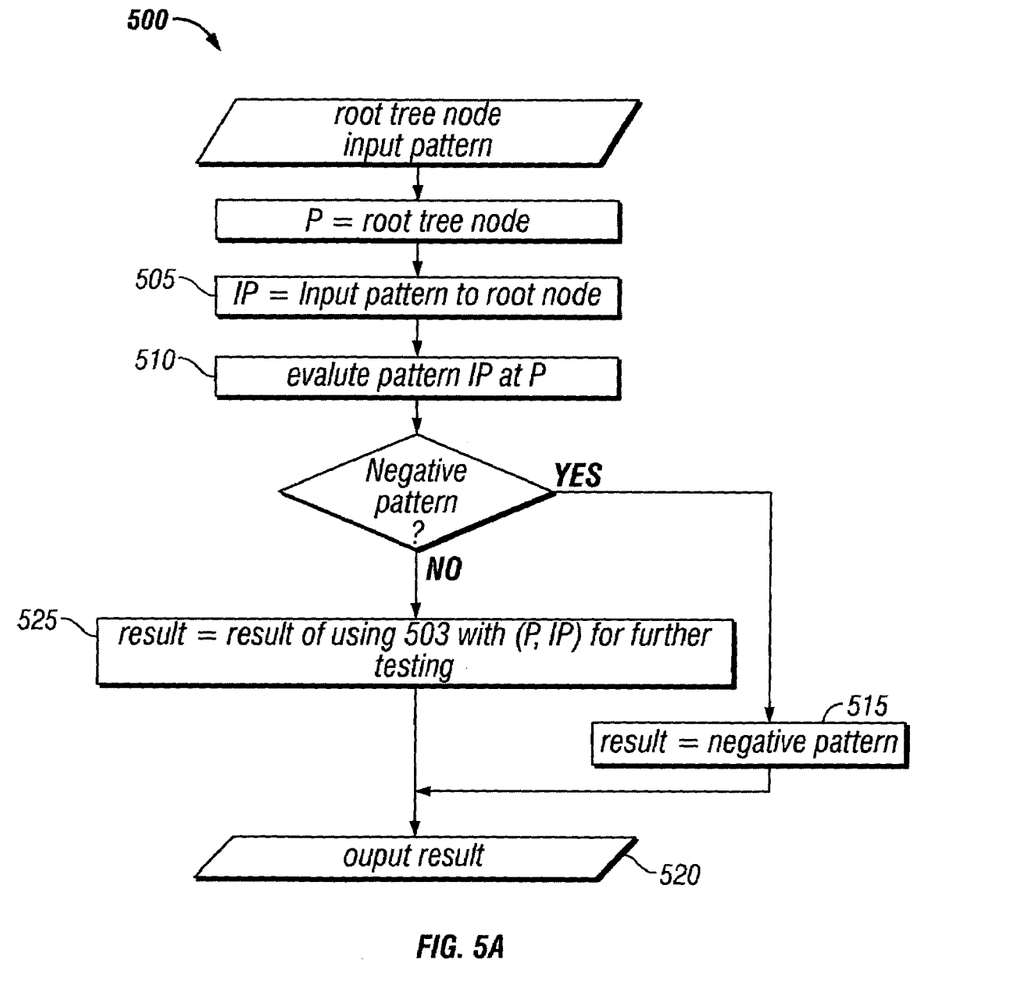
FIGS. 5A and 5B show a flowchart describing a classification operation using the tree classifier.

FIG. 5A is a flowchart describing a classification operation 500 using a tree classifier. During classification, a depth-first search algorithm is applied to find an acceptance path from the root to a terminal node of the detection tree. A pattern may be input to the tree classifier at the root node (block 505). The root node may determine whether the input pattern is positive or negative (block 510). If the root node determines that the input pattern is negative, the pattern may be labeled accordingly (block 515), and the result output (block 520). If the root node does not determine the pattern to be negative, the pattern may be passed to the next stage (block 525).

Figure 5B:
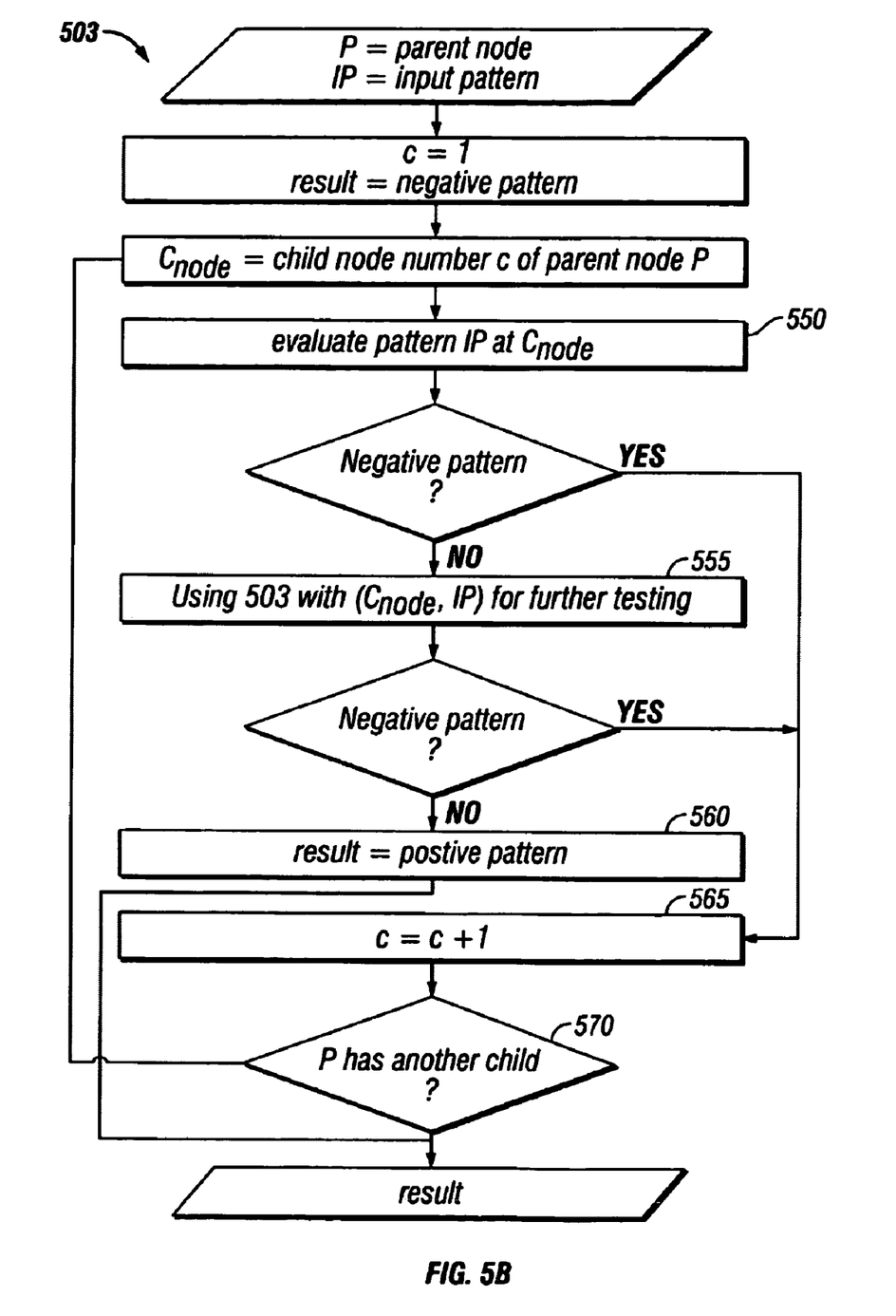

FIG. 5B shows a classification process 503 at node levels below the root node. A child node evaluates a pattern passed from its parent node (block 550). If the child node does not determine the pattern to be negative, the pattern is passed to other classifiers lower in the cascade (branch) (block 555). If the an acceptance path is found, the pattern is labeled positive (block 560). If the classifier at the child node determines the pattern is negative, the pattern is passed to another child node (block 565), if the parent node has any other child nodes (block 570).

Figure 6:
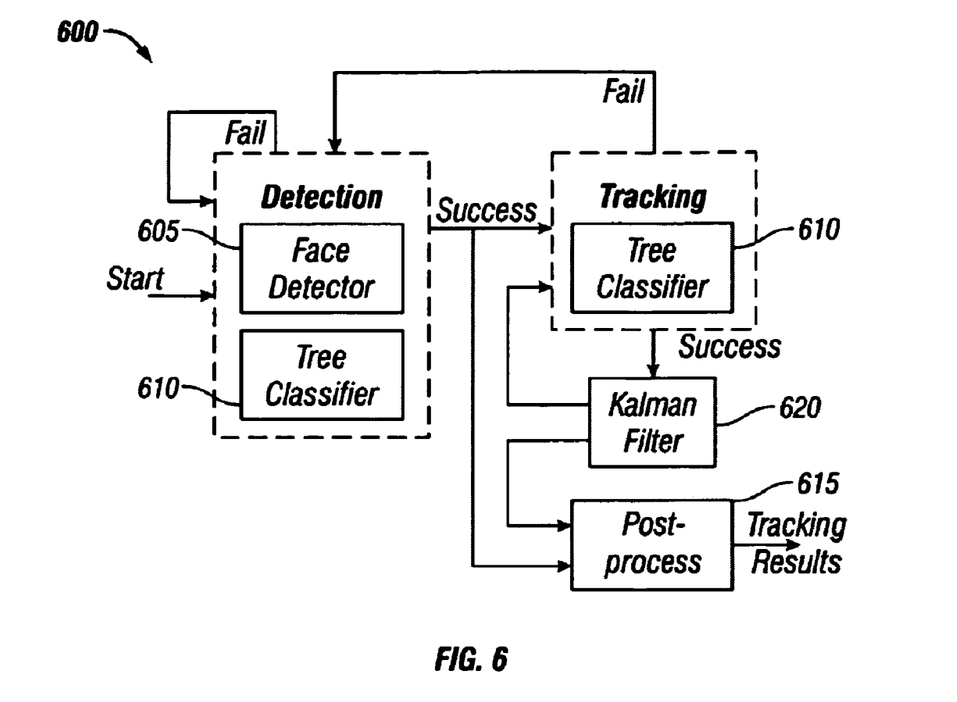
FIG. 6 is a system which includes a tree classifier.

FIG. 6 shows a system 600 which integrates the tree classifier into a general framework for object detection and tracking. The system has been used for human mouth detection and tracking in video sequences, however, the general framework may be used for other complex object detection and tracking problems.

The system 600 may include a finite state machine with two states: detection and tracking. The system may begin with the detection state in which a face detector 605 followed by a tree classifier 610 for mouth detection is utilized to locate the face of a speaker as well as his/her mouth location. If the detections are successful in several successive frames, the state machine may enter the tracking state where only the tree classifier 610 is employed to detect the mouth in the region around the location predicted from previous detection or tracking results. If any detection failure occurs in the tracking state, the state machine may switch back to the detection state to recapture the object. The system 600 may also include a post-processing module 615 to smooth the raw mouth locations and conceal accidental detection failures.

In an embodiment, the face detector 605 may be a single cascade classifier, which may be powerful enough for detection of full, upright faces. The search area for the mouth with the tree classifier 610 may be reduced to the lower region of the detected face. To accommodate scale variations, a multi-scale search may be utilized within a constrained range estimated according to the face detection result.

In the tracking state, only the tree classifier 610 may be used to detect the mouth. A linear Kalman filter (LKF) 620 may be employed to predict the center of the search region in the next frame and correct the result in the current frame. The LKF 620 may address the general problem of estimating the state X of a discrete-time process that is governed by a linear stochastic difference equation $$X_{k+1} = AX_k + w_k$$

with a measurement Z, which is $$Z_k = HX_k + v_k$$

The random variables $w_k$ and $v_k$ are assumed to be independent of each other and have normal probability distributions. In an embodiment, a Newton dynamics model may be employed, i.e., $$X = \begin{pmatrix} x_c \\ y_c \\ \dot{x}_c \\ \dot{y}_c \\ \ddot{x}_c \\ \ddot{y}_c \end{pmatrix} A = \begin{pmatrix} 1 & 0 & \Delta t & 0 & \Delta t/2 & 0 \\ 0 & 1 & 0 & \Delta t & 0 & \Delta t/2 \\ 0 & 0 & 1 & 0 & \Delta t & 0 \\ 0 & 0 & 0 & 1 & 0 & \Delta t \\ 0 & 0 & 0 & 0 & 1 & 0 \\ 0 & 0 & 0 & 0 & 0 & 1 \end{pmatrix} Z = \begin{pmatrix} x_c \\ y_c \end{pmatrix} H = (I, 0)^T,$$

where $\Delta t = 0.4$ based on a frame rate of 25 Hz. In practice, the search region in the next frame t+1 may centered around ($x_c$, $y_c$) obtained from the time update with a width and height of 40% larger than the detected mouth at time t.

The post-processing module 615 may be used to refine the trajectory of mouth in three phases. A linear interpolation may be employed to fill in the gaps in trajectory caused by detection failures. A median filter may then be used to eliminate incorrect detections under the assumption that outliers only occur individually. A Gaussian filter may then be used to suppress the jitter in the trajectory.

Figure 7A:
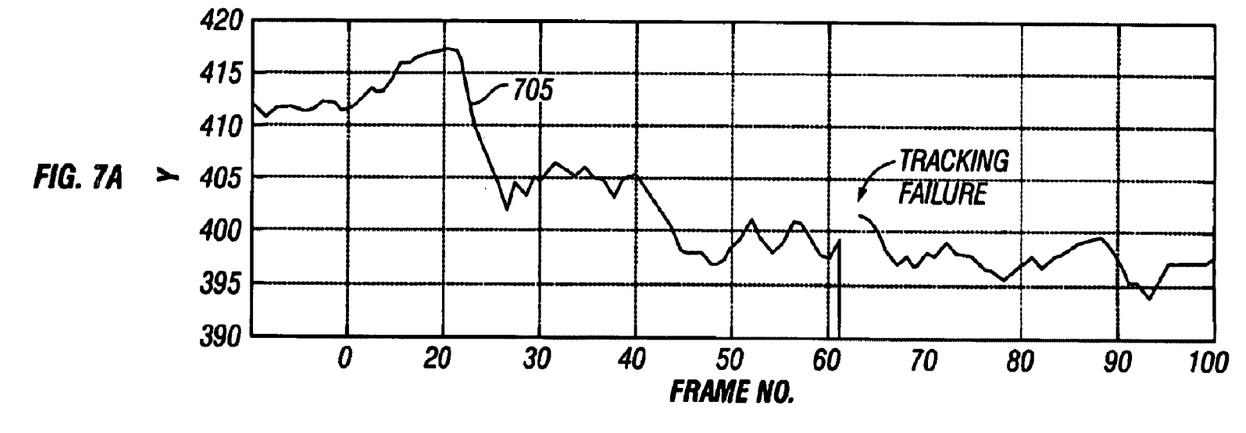
FIGS. 7A and 7B are plots showing the Y positions of tracked mouth in a video sequence.
Figure 7B:
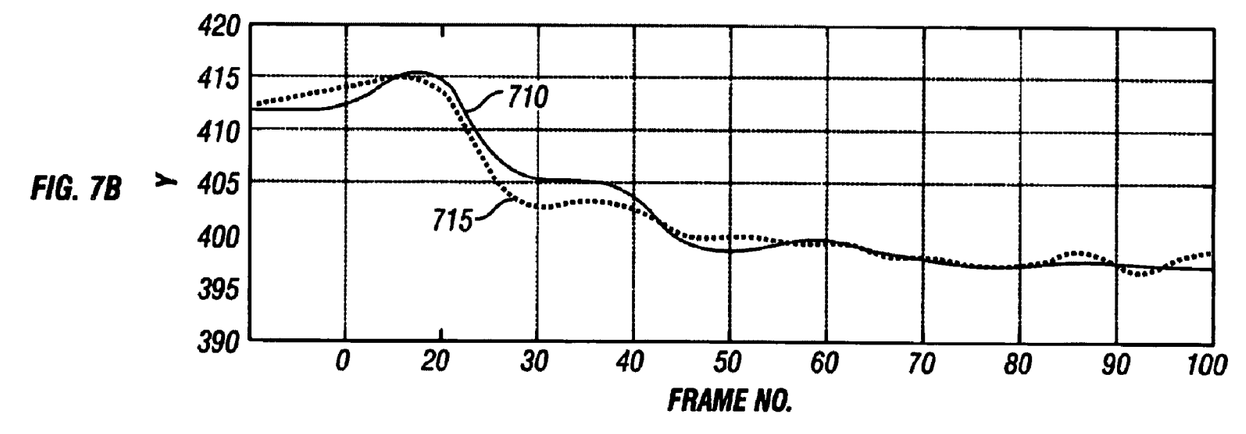

FIGS. 7A and 7B show the Y positions of the tracked mouth in the first 100 frames of sequence 276_1_4 to 5 in the XM2FDB database, a multimodal face database which includes more than 1,000 GBytes of digital video sequences. FIG. 7A shows the Y positions 705 before post-process. FIG. 7B shows the Y positions 710 after post-process, and the actual Y positions 715.

Figure 8:
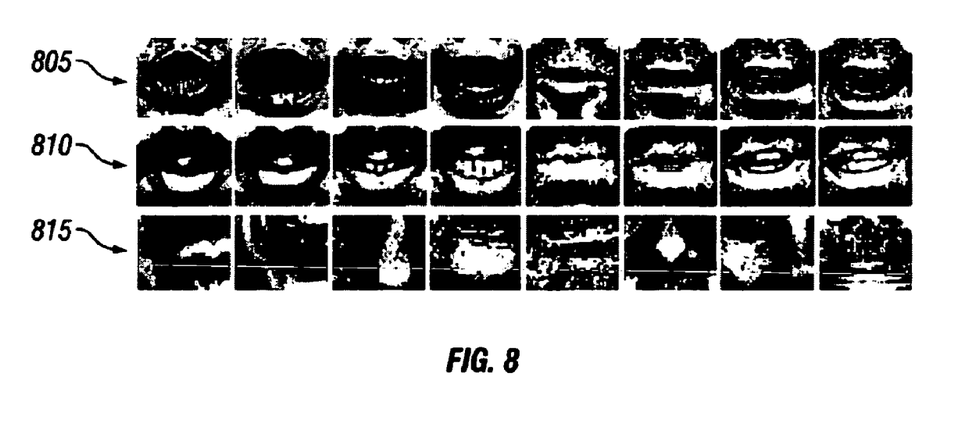
FIG. 8 shows training samples for mouths with and without beards and non-mouth samples.

For training, 1,050 mouth images were extracted from the sequences of the "Client" subset of the XM2FDB database. These sample images were manually classified into two hundred-fifty images of speakers with beard and eight hundred without beard. By randomly mirroring, rotating, and re-scaling these images, six thousand positive training samples of speakers with beard and nine thousand without beard were generated. Negative training examples were randomly extracted from a set of approximately 16,500 face-free and mouth-free images. FIG. 8 shows some training samples of mouth regions without beard (top row) 805, mouth regions with beard (middle row) 810, and difficult non-mouth samples (bottom row) 815.

Figure 9:
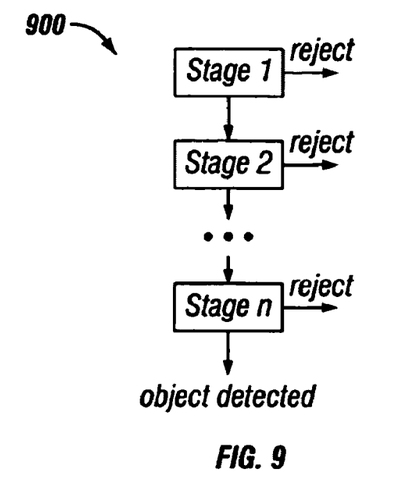
FIG. 9 is a block diagram of a system including a cascade classifier.
Figure 10:
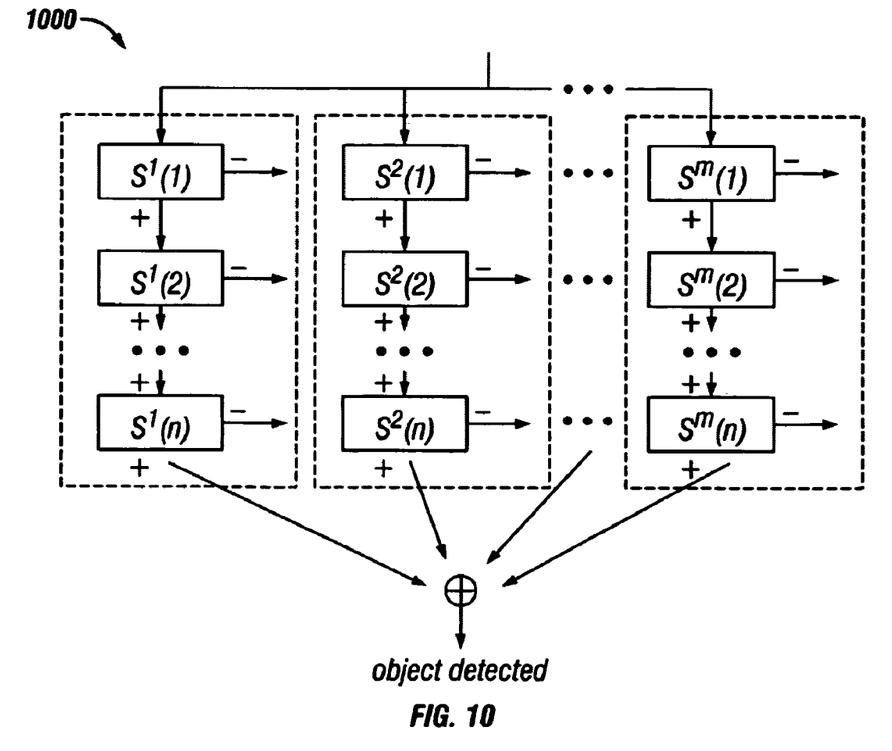
FIG. 10 is a block diagram of a system including a multiple cascade classifier.

Three mouth tracking systems were built and compared. FIG. 9 shows a system 900 based on a cascade classifier. The system included eighteen stages trained on all positive mouth samples (15,000 in total) and 10,000 negative examples at each stage. The system 1000 shown in FIG. 10 was based on two specialized cascade classifiers with seventeen stages, one for mouth regions of speakers with beard and one for mouth regions of speakers without beard. For each classifier, all positive samples of the respective type plus 10,000 negative examples where used for training at each stage.

The third system was based on a tree classifier, such as that shown in FIG. 1, with seventeen stages and two branches, with a split point at stage three. The system was trained with the same data set as used for system 900.

The three systems were tested on the "Imposter" subset of the XM2FDB database with 759 sequences recorded from 95 speakers using an Intel® Pentium® 4 computer with 1.7 GHz and 1 GB RAM.

TABLE 1

| Type for Classifier | Correct | Correct Rate | Execution time/frame Detection | Tracking |
|---|---|---|---|---|
| Single Cascade (1) | 713 | 93.9% | 38.0 ms | 7.3 ms |
| Parallel cascades (2) | 732 | 96.4% | 42.7 ms | 9.4 ms |
| Detection Tree (3) | 722 | 95.1% | 33.8 ms | 6.5 ms |
| SVMs | 699 | 92.1% | 2,232 ms | 99 ms |

Table 1 lists the accuracy and the average execution time per frame obtained by each system, together with the results obtained by the support vector machine (SVM) based system. The results indicate that the tree classifier is superior to the cascade classifier with respect to accuracy, while having the shortest execution time of all three systems. Only the detection accuracy for multiple specialized cascade classifiers was slightly better but at a significantly higher computational cost, e.g., about 45% more demanding. In addition, compared with the SVM based system, the tree classifier based system was about sixty-six and fifteen times faster in detection and tracking, respectively, while preserving at least the same accuracy.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A method comprising:
building a tree classifier, which rejects non-object patterns in input data representing real world objects, including a plurality of parent nodes, wherein the tree classifier is stored on a machine-readable medium and is trained to perform human south detection and tracking in video sequences; and
for a parent node in the tree classifier, selecting between a monolithic classifier as a child node and a plurality of specialized classifiers as child nodes for said parent node;
wherein said selecting comprises:
determining a computational complexity of a monolithic classifiers trained with a plurality of positive and negative samples; and
determining a computational complexity of a plurality of specialized classifiers trained with the plurality of positive and negative samples, each of the specialized classifiers being trained with the plurality of negative samples and a different subset of the plurality of positive samples; and
wherein human mouth detection and tracking in video sequences occurs when other tree classifier is executed.

2. The method of claim 1, wherein said determining a computational complexity of the monolithic classifier comprises determining a number of features used by the monolithic classifier, and
wherein said determining a computational complexity of the plurality of specialized classifiers comprises determining a number of features used by the plurality of specialized classifiers.

3. The method of claim 1, further comprising training the monolithic classifier and the plurality of specialized classifiers with a boosting algorithm.

4. The method of claim 1, further comprising training the monolithic classifier and the plurality of classifiers to have a selected hit rate and a selected false alarm rate.

5. A method comprising:
building a tree classifier, which rejects non-object patterns in input data representing real world objects, wherein the tree classifier is stored on a machine-readable medium and is trained to perform human mouth detection and tracking in video sequences, the building including:
identifying a plurality of positive samples and the plurality of negative samples in a plurality of patterns;
passing the plurality of positive samples and the plurality of negative samples to a node in the tree classifier;
determining a number of features used by a monolithic classifier trained with said plurality of positive samples and said plurality of negative samples;
clustering the plurality of positive samples into a plurality of subsets;
training each of a plurality of specialized classifiers with the plurality of negative samples and a different one of said plurality of subsets;
determining a number of features used by the plurality of specialized classifiers; and selecting the plurality of specialized classifiers in response to the number of features used by the plurality of specialized classifiers being smaller than the number of features used by the monolithic classifier; and wherein human mouth detection and tracking in video sequences occurs when the tree classifier is executed.

6. The method of claim 5, further comprising:

training each of the plurality of specialized classifiers with a boosting algorithm.

7. The method of claim 5, further comprising repeating elements of the method until a desired depth is achieved.

8. An article, comprising a machine-readable medium including machine-executable instructions operative to cause a machine to perform operations comprising:

build a tree classifier, which rejects non-object patterns in input data representing real world objects, including a plurality of parent nodes, wherein the tree classifier is stored on a machine-readable medium and is trained to perform human mouth detection and tracking in video sequences; and for a parent node in the tree classifier, select between a monolithic classifier as a child node and a plurality of specialized classifiers as child nodes for said parent node;

wherein the instructions operative to cause the machine to select comprise instructions operative to cause the machine to:

determine a computational complexity of a monolithic classifier trained with a plurality of positive and negative samples; and determine a computational complexity of a plurality of specialized classifiers trained with the plurality of positive and negative samples, each of the specialized classifiers being trained with the plurality of negative samples and a different subset of the plurality of positive samples; and perform human mouth selection and tracking in video sequences using the trained tree classifier.

9. The article of claim 8, wherein the instructions operative to cause the machine to determine a computational complexity of the monolithic classifier comprise instructions operative to cause the machine to determine a number of features used by the monolithic classifier, and the instructions operative to cause the machine to determine a computational complexity of the plurality of specialized classifiers comprise instructions operative to cause the machine to determine a number of features used by the plurality of specialized classifiers.

10. The article of claim 8, wherein the instructions operative to cause a machine to perform operations further comprise instructions operative to cause the machine to train the monolithic classifier and the plurality of specialized classifiers with a boosting algorithm.

11. The article of claim 8, wherein the instructions operative to cause a machine to perform operations further comprise instructions operative to cause the machine to train the monolithic classifier and the plurality of classifiers to have a selected hit rate and a selected false alarm rate.

12. An article comprising a machine-readable medium including machine-executable instructions operative to cause a machine to perform operations comprising:

build a tree classifier, which rejects non-object patterns in input data representing real world objects, wherein the tree classifier is stored on a machine-readable medium and is trained to perform human mouth detection and tracking in video sequences, the building including:

identify a plurality of positive samples and a plurality of negative samples in a plurality of patterns;

pass the plurality of positive samples and the plurality of negative samples to a node in the tree classifier;

determine a number of features used by a monolithic classifier trained with said plurality of positive samples and said plurality of negative samples;

cluster the plurality of positive samples into a plurality of subsets;

train each of a plurality of specialized classifiers with the plurality of negative samples and a different one of said plurality of subsets;

determine a number of features used by the plurality of specialized classifiers; and select the plurality of specialized classifiers in response to the number of features used by the plurality of specialized classifiers being smaller than the number of features used by the monolithic classifier; and perform human mouth detection and tracking in video sequences using the trained tree classifier.

13. The article of claim 12, further comprising instruction operative to cause the machine to:

train each of the plurality of specialized classifiers with a boosting algorithm.

* * * * *